United States Patent
Xu et al.

(10) Patent No.: US 9,591,326 B2
(45) Date of Patent: Mar. 7, 2017

(54) POWER EFFICIENT MOTION ESTIMATION TECHNIQUES FOR VIDEO ENCODING

(75) Inventors: Lidong Xu, Beijing (CN); Yi-Jen Chiu, San Jose, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 13/638,628

(22) PCT Filed: Mar. 31, 2010

(86) PCT No.: PCT/CN2010/071451
§ 371 (c)(1),
(2), (4) Date: Oct. 1, 2012

(87) PCT Pub. No.: WO2011/120221
PCT Pub. Date: Oct. 6, 2011

(65) Prior Publication Data
US 2013/0022126 A1     Jan. 24, 2013

(51) Int. Cl.
*H04N 19/53*     (2014.01)
*H04N 19/30*     (2014.01)
(Continued)

(52) U.S. Cl.
CPC ........... *H04N 19/53* (2014.11); *H04N 19/105* (2014.11); *H04N 19/174* (2014.11);
(Continued)

(58) Field of Classification Search
CPC ...... H04N 19/109; H04N 19/53; H04N 19/57; H04N 19/30; H04N 19/33; H04N 19/37; H04N 19/187
See application file for complete search history.

(56) References Cited

U.S. PATENT DOCUMENTS 6,463,100 B1 * 10/2002 Cho .................... H04N 19/105
                                                            375/240.03
6,549,575 B1 * 4/2003 Butter .................... H04N 19/53
                                                            375/240.16
(Continued)

FOREIGN PATENT DOCUMENTS

CN     1694495     11/2005
CN     1933600     3/2007

OTHER PUBLICATIONS

Zhengning Wang et al., "An Efficient Algorithm for Motion Estimation with Multiple Reference Frames in H.264/AVC," Fourth International Conference on Image and Graphics, Dec. 31, 2007, pp. 259-262.
(Continued)

*Primary Examiner* — David N Werner
(74) *Attorney, Agent, or Firm* — Trop Pruner & Hu, P.C.

(57) ABSTRACT

Adaptive control can use hierarchical motion estimation (HME) and/or multiple reference motion estimation (MRME) for the motion estimation of current encoding blocks. Both HME and MRME are allowed in the motion estimation to achieve a high coding gain. Control consists of slice level control and macro-block (MB) level control. A slice is one or more contiguous macroblocks. In slice level control, it is decided to use only one reference frame or use multiple reference frames to coding current slice based on the motion vectors obtained in coarse level motion estimation. In MB level control, it is decided to perform MRME or perform HME for the MB and its subblocks based on the coarse level motion vectors of the MB.

20 Claims, 6 Drawing Sheets

(51) Int. Cl.
*H04N 19/187* (2014.01)
*H04N 19/37* (2014.01)
*H04N 19/33* (2014.01)
*H04N 19/57* (2014.01)
*H04N 19/105* (2014.01)
*H04N 19/174* (2014.01)
*H04N 19/61* (2014.01)
*H04N 19/176* (2014.01)
*H04N 19/573* (2014.01)
*H04N 19/109* (2014.01)

(52) U.S. Cl.
CPC ......... *H04N 19/176* (2014.11); *H04N 19/187* (2014.11); *H04N 19/30* (2014.11); *H04N 19/33* (2014.11); *H04N 19/37* (2014.11); *H04N 19/57* (2014.11); *H04N 19/573* (2014.11); *H04N 19/61* (2014.11); *H04N 19/109* (2014.11)

(56) References Cited

U.S. PATENT DOCUMENTS

| | | | |
|---|---|---|---|
| 6,721,454 B1 * | 4/2004 | Qian | G06F 17/30802 382/103 |
| 7,433,407 B2 | 10/2008 | Lee et al. | |
| 2004/0218676 A1 * | 11/2004 | Ha | G11B 27/28 375/240.16 |
| 2005/0074064 A1 * | 4/2005 | Lee | G06T 7/2026 375/240.16 |
| 2006/0126952 A1 * | 6/2006 | Suzuki | G06T 5/002 382/233 |
| 2007/0074266 A1 * | 3/2007 | Raveendran | H04N 5/144 725/135 |
| 2007/0121728 A1 * | 5/2007 | Wang | H04N 19/563 375/240.18 |
| 2007/0195887 A1 * | 8/2007 | Comer | H04N 19/176 375/240.21 |
| 2008/0232478 A1 * | 9/2008 | Teng | H04N 19/00939 375/240.27 |
| 2012/0281759 A1 * | 11/2012 | Xu | H04N 19/105 375/240.16 |

OTHER PUBLICATIONS

Bo Shen et al., "Adaptive Motion-Vector Resampling for Compressed Video Downscaling," IEEE Transactions on Circuits and Systems for Video Technology, vol. 9, No. 6, Sep. 1999, pp. 929-936.

* cited by examiner

POWER EFFICIENT MOTION ESTIMATION TECHNIQUES FOR VIDEO ENCODING

RELATED ART

H.264, also known as advanced video codec (AVC), and MPEG-4 Part 10 are ITU-T/ISO video compression standards that are expected to be widely pursued by the industry. The H.264 standard has been prepared by the Joint Video Team (JVT), and consisted of ITU-T SG16 Q.6, known as VCEG (Video Coding Expert Group), and also consisted of ISO/IEC JTC1/SC29/WG11, known as MPEG (Motion Picture Expert Group). H.264 is designed for applications in the area of Digital TV broadcast (DTV), Direct Broadcast Satellite (DBS) video, Digital Subscriber Line (DSL) video, Interactive Storage Media (ISM), Multimedia Messaging (MMM), Digital Terrestrial TV Broadcast (DTTB), and Remote Video Surveillance (RVS).

Motion estimation (ME) in video coding may be used to improve video compression performance by removing or reducing temporal redundancy among video frames. For encoding an input block, traditional motion estimation may be performed at an encoder within a specified search window in reference frames. This may allow determination of a motion vector that minimizes the sum of absolute differences (SAD) between the input block and a reference block in a reference frame. The motion vector (MV) information can then be transmitted to a decoder for motion compensation.

Where original input frames are not available at the decoder, ME at the decoder can be performed using the reconstructed reference frames. When encoding a predicted frame (P frame), there may be multiple reference frames in a forward reference buffer. When encoding a bi-predictive frame (B frame), there may be multiple reference frames in the forward reference buffer and at least one reference frame in a backward reference buffer. For B frame encoding, mirror ME or projective ME may be performed to determine the MV. For P frame encoding, projective ME may be performed to determine the MV.

DETAILED DESCRIPTION

Figure 1:
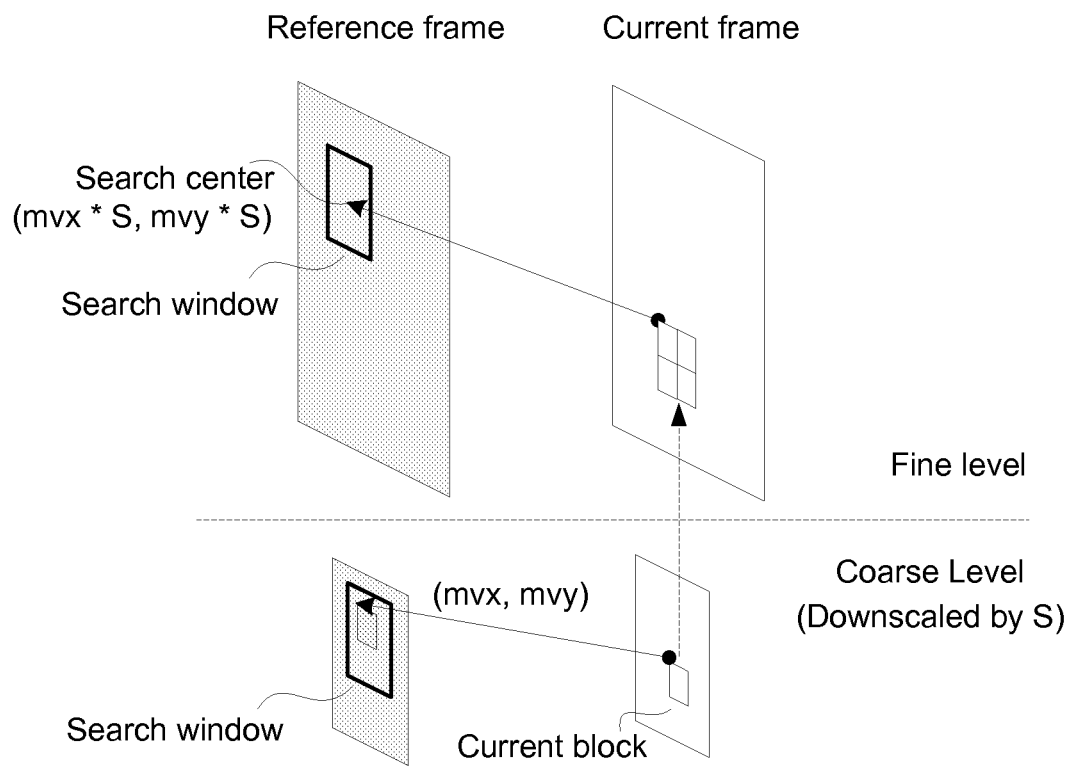
FIG. 1 depicts an example of hierarchical motion estimation (HME).

Known solutions may use only one reference frame instead of multiple reference motion estimation (MRME) to reduce the coding complexity or use hierarchical motion estimation (HME) to deal with high motions when the search window is very limited. It is known that using only one reference fame may not be sufficient to achieve high coding gain, and using HME may be not efficient for some blocks of the pictures.

ME acquires the predictions of a current encoding block from reference frames. ME includes a motion search within a search window centered by the search center in reference frames. Generally, higher coding gain may be achieved when a larger search window is used. On the other hand, using a larger search window increases the encoding complexity greatly, which may be power-use inefficient. In addition, for a hardware implementation, a search window may be very small due to the very limited on-chip memory size. In various embodiments, hierarchical motion estimation (HME) can be utilized to extend the search range of a small window by downscaling reference frames and using the small search window. But for blocks with small inter-frame motion, the small search window may be enough and as a result, HME may waste power for small inter-frame motion blocks. To achieve higher coding gain, multiple reference motion estimation (MRME) can be applied for blocks with small inter-frame motion so that motion search will be performed on multiple available reference frames to determine the prediction for the current encoding block. The reference index will be transmitted to the decoder side for motion compensation. For some high motion blocks, motion search on the nearest reference frame is enough and may save power associated with searching multiple frames.

Various embodiments adaptively control whether to use HME and/or MRME for encoding a current block, which can greatly save the coding power while also achieving high coding gains. Control can be based on slice level control and/or macroblock (MB) level control. A slice is one or more contiguous macroblocks. The order of macroblocks within a slice can be from left-to-right and top-to-bottom. Based on motion vectors determined using HME, the MBs can be divided into three categories, high motion MBs, low motion MBs, and other MBs. If there are too many high motion MBs in a current slice, experimental results show that MRME will not benefit the coding gain of the whole slice. In slice level control, it is decided to use only one reference frame to encode blocks of a current slice when there are too many high motion MBs in the current slice. However, other numbers of reference frames can be used such as two or three. Setting a number of reference frames to one allows the encoder to look for a motion vector in a single reference frame. The selected reference frame can be the closest frame in time (either forward or backward) or a frame that is similar to the current frame but not closest in time (e.g., harmonic motion). For all blocks in this slice, the reference index is not encoded into the bitstream because the decoder is aware of the reference frame to use when no reference index is provided. In addition, motion search on a single reference frame may be sufficient, and as a result, motion estimation using multiple reference frames may waste power for these blocks. Not encoding the reference index may save bits and may improve the coding gain.

For a non-high-motion slice, the number of reference frames for this slice can be set to any number such as a maximum allowed reference frames. For example, H.264 allows up to 16 reference frames.

In MB level control, it is decided whether to perform MRME or perform HME for a MB and its subblocks based on the motion vector (MV) of the MB determined using HME. Based on the MV determined using HME, if an MB is high motion, HME is performed for the MB and its subblocks. Based on the MV determined using HME, if an MB is low motion, MRME is performed for the MB and its subblocks. But if the low motion MB is in a high motion slice, then one reference frame can be used to encode the low motion MB and its subblocks. If the MB is neither high motion nor low motion, either HME or MRME or combination of HME and MRME can be applied to the MB and its subblocks. A combination of HME and MRME means extended search range in multiple available reference frames.

MRME applies motion search on multiple available reference frames to acquire prediction for a current encoding block and the reference index will be transmitted to the decoder side for correct motion compensation. A reference picture buffer stores decoded reference pictures. Those reference frames could be selected as reference frames in MRME. A reference picture can be chosen based on the closest temporal distance or picture-level similarity measurement. Multiple reference motion estimation may increase the encoder complexity.

Adaptive control of HME and MRME for encoding the current block can greatly save the coding power while also achieve high coding efficiency gain.

FIG. 1 depicts an example of hierarchical motion estimation (HME). Before motion estimation, a current frame and a reference frame are downscaled to coarse level frames by a factor of S. In other words, the width and height of the downscaled frames are 1/(S*S) of the original frame sizes. The original frames are called fine level frames. Generally, S may be set to 1.5, 1.6, 2, 4, 8, or other values. Motion estimation can be performed for each M×N block in the downscaled, coarse level current frame. Motion estimation is performed within the small search window having a size of W×H in the downscaled, coarse level reference frame. After obtaining the coarse level motion vector (mvx, mvy), the upscaled motion vector (mvx*S, mvy*S) is used as the search center and motion search is performed on fine level frames within the W×H search window to find a fine level motion vector. The upscaled MV (mvx*S, mvy*S) can be used as the search center for the pixels in a (M*S)×(N*S) block in a fine level current frame. For a W×H search window, the largest motion that can be searched is W/2 in the positive/negative horizontal direction and H/2 in positive/negative vertical direction. After HME, the biggest motion that can be searched is (S+1)W/2 in the horizontal direction and (S+1)H/2 in the vertical direction. The downscaled frame can be downscaled more than once. For example, an original picture of size 120 can be downscaled using S=2 to 60×60 pixels and then downscaled again to 30×30 pixels. The search window can be applied to one or more of the downscaled pictures.

HME can greatly reduce the ME complexity while achieving the same motion range. Complexity may refer to the processor software computational cycle or to the hardward gate count of the chip. Let the complexity of performing M×N block ME within a W×H search window be C. Then the complexity of HME for encoding the whole fine level frame is approximately K*C+S*S*K*C=(S*S+1)KC, where K is the number of M×N block in coarse level. But if a search window is ((S+1)W)×((S+1)H) in fine level, the ME complexity for encoding the whole fine level frame will be approximately (S+1)*(S+1)*S*S*K*C which is many times of HME.

In some embodiments, a flag mb_HME_flag=1 is set to tell the encoder to apply HME to determine a motion vector for the macro block.

In some advanced video coding standards, e.g., H.264/AVC, motion estimation can be performed in multiple reference frames and the reference index and motion vectors of the best predictions are transmitted to the decoder for motion compensation. The number of maximum allowed reference frames can be signaled in a slice header. If the maximum allowed reference is one, then the reference index for each block may not be encoded if the decoder knows that the reference index is 0 for those blocks. Otherwise, the reference index is encoded. MRME may reduce the prediction errors, but encoding bits for the reference index is non-neglectable overhead. MRME may use more overhead than HME by informing decoder what reference frames are used in encoding.

Experimental results show that HME has visible gains in terms of higher coding efficiency when the inter-frame block motion is large whereas MRME has visible gains of higher coding efficiency when inter-frame block motion is relatively small. Accordingly, an adaptive control mechanism can be used to adaptively to decide to use HME or MRME to encode a block. Adaptive control can greatly reduce the coding complexity and improve the coding gain. For example, if the true block motion is very small, performing general ME within a W×H search window on a fine level may be enough to obtain a motion vector. In such case, HME is not necessary for these small motion blocks and MRME can be used instead.

Figure 2:
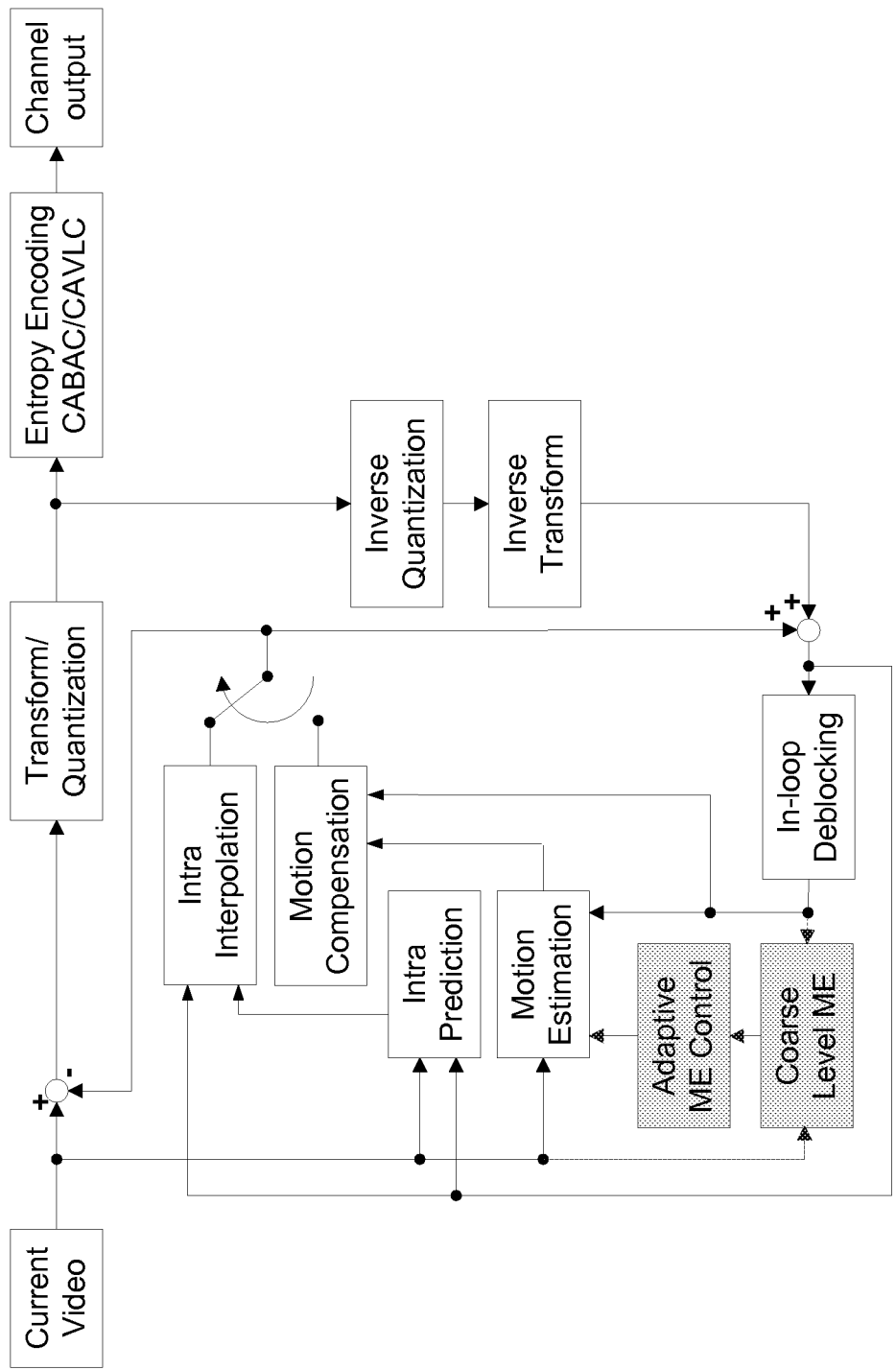
FIG. 2 shows the block diagram of a video encoding system.

FIG. 2 shows the block diagram of a video encoding system. Adaptive ME Control block informs Motion Estimation block to perform MRME or to use motion vectors from Coarse Level ME block based on whether a slice or macro block is high or low motion. Motion Estimation block supports MRME and the traditional fine level motion search around a search center using predicted MV (pmv) within an W×H search window.

Coarse Level ME block determines motion vectors based on HME. HME can be utilized for large motions and adaptive control of HME and MRME is applied to reduce the coding complexity.

After performing coarse level ME for all M×N blocks in a coarse level slice, slice level control is performed based on the obtained coarse level motion vectors. For S=4 and M×N=4×4 block, the corresponding block in fine level is a 16×16 macroblock. A fine level MB can be defined as a high motion MB if its coarse level MV satisfies "abs(mv_x)>=TH_1||abs(mv_y)>=TH_1", where TH_1 may be a predefined constant. Suppose that the total number of macro blocks in the input slice is total_MBs and there are N high motion macroblocks in the input slice. If N/total_MBs is larger than a predefined threshold TH_0, the input slice is regarded as a high motion slice.

For a high motion slice, MRME may not provide an appreciable gain to the video coding system. In addition, the bit overhead for encoding a reference index may even degrade the coding gain. Accordingly, for a high motion slice, the ME is limited to the nearest reference frame in time or picture-level and in the slice header, the allowed number of reference frames is signaled to be 1. For all blocks in this slice, the reference index will not be encoded, thereby saving bandwidth. The reference index is transmitted with a slice to a decoder or could be based on a common understanding between the encoder and decoder so no index is transmitted.

For a non-high-motion slice, the number of reference frames used to determine motion vectors for blocks in the slice, slice_num_ref, can be set to M, where M is the number of available frames in the reference buffer of the encoder. In H.264/AVC, the maximum allowed reference frames is signaled in a sequence parameter header.

Figure 3:
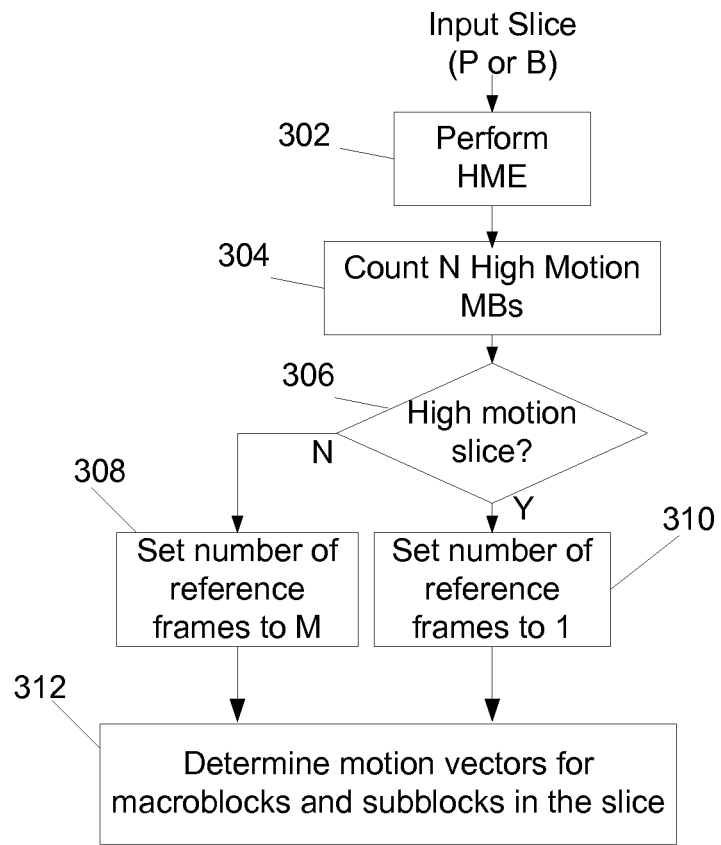
FIG. 3 shows a flow diagram of a manner to determine whether to use HME or MRME to determine motion vectors for blocks of an input slice of a P or B picture.

FIG. 3 shows a flow diagram of a manner to determine whether to use HME or MRME to determine motion vectors for blocks of an input slice of a P or B picture.

Block 302 includes performing HME on the slice to determine coarse motion vectors. For example, HME techniques described with regard to FIG. 1 can be used to determine motion vectors for each of the macro blocks in a slice. An input slice is downscaled to a coarse level slice and the downscaled coarse level reference frames are available in the reference buffer. Then, for the ith M×N block in the current coarse level slice, motion estimation is performed within a W×H search window to acquire its motion vector (mvx(i), mvy(i)). For example, the block can be 4×4 and the search window can be 48×40. This motion vector can be used as a search center for the pixels in the corresponding (M*S)×(N*S) block, e.g., 16×16 block, in the frame of original dimensions.

Block 304 includes determining a number N of high motion macro blocks in the slice. A MB is regarded as a high motion MB if abs(mv_x)>=TH_1||abs(mv_y)>=TH_1, where || represents a logical OR, mv_x is a scaled-up motion vector in the x direction, mv_y is a scaled-up motion vector in the y direction, and TH_1 is a threshold.

Block 306 includes determining if a slice is a high motion slice. For example, a high motion slice can be one where a certain number of macro blocks in a slice are high motion. Block 306 can include determining whether N/total_MBs>TH_0, where total_MBs is a total number of macro blocks in a slice and TH_0 is a threshold value. If the slice is not a high motion slice, then block 308 follows block 306. If the slice is a high motion slice, then block 310 follows block 306.

Block 308 includes setting a number of reference frames used to determine motion vectors for macro blocks in the current slice to M, the number of available frames in the reference buffer of the encoder.

Block 310 includes setting a number of reference frames used to determine motion vectors for macro blocks in the current slice to one. However, the number of reference frames can be more than one.

Figure 5:
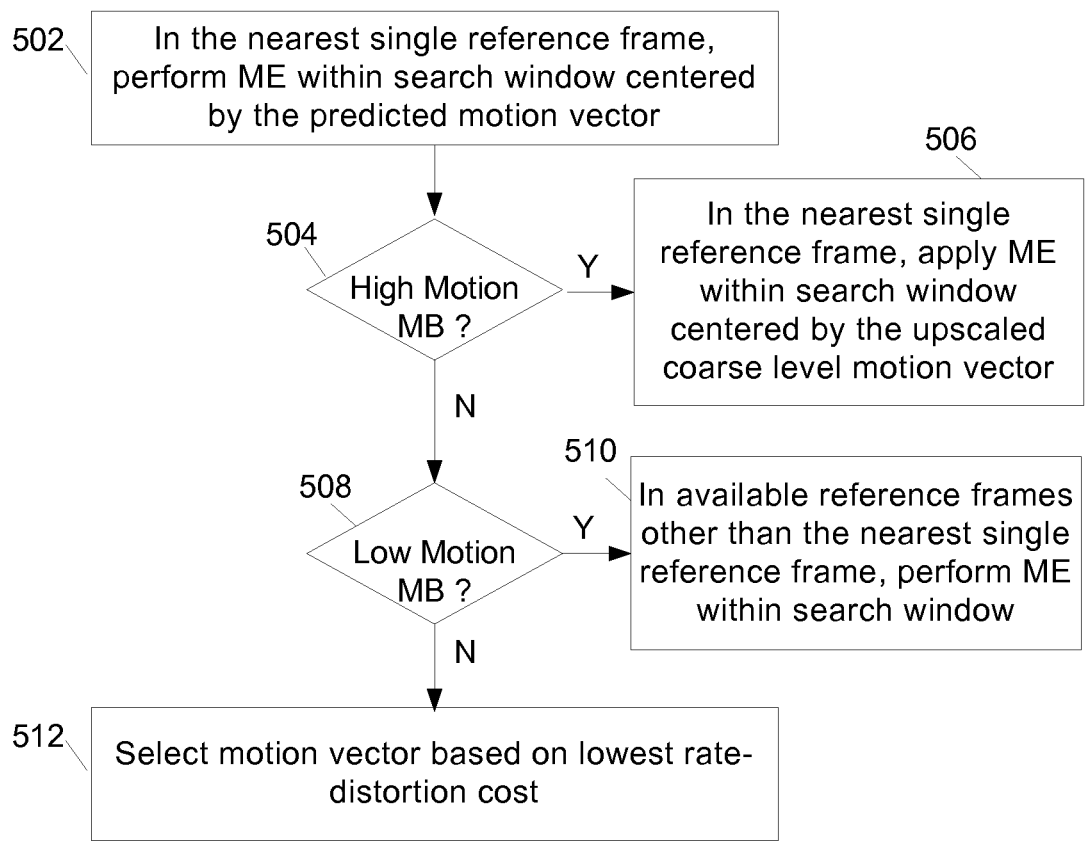
FIG. 5 depicts a manner of determining motion vectors for macro blocks.

Block 312 includes determining motion vectors for all MB and subblocks in the slice in a manner described with regard to FIG. 5.

Figure 4:
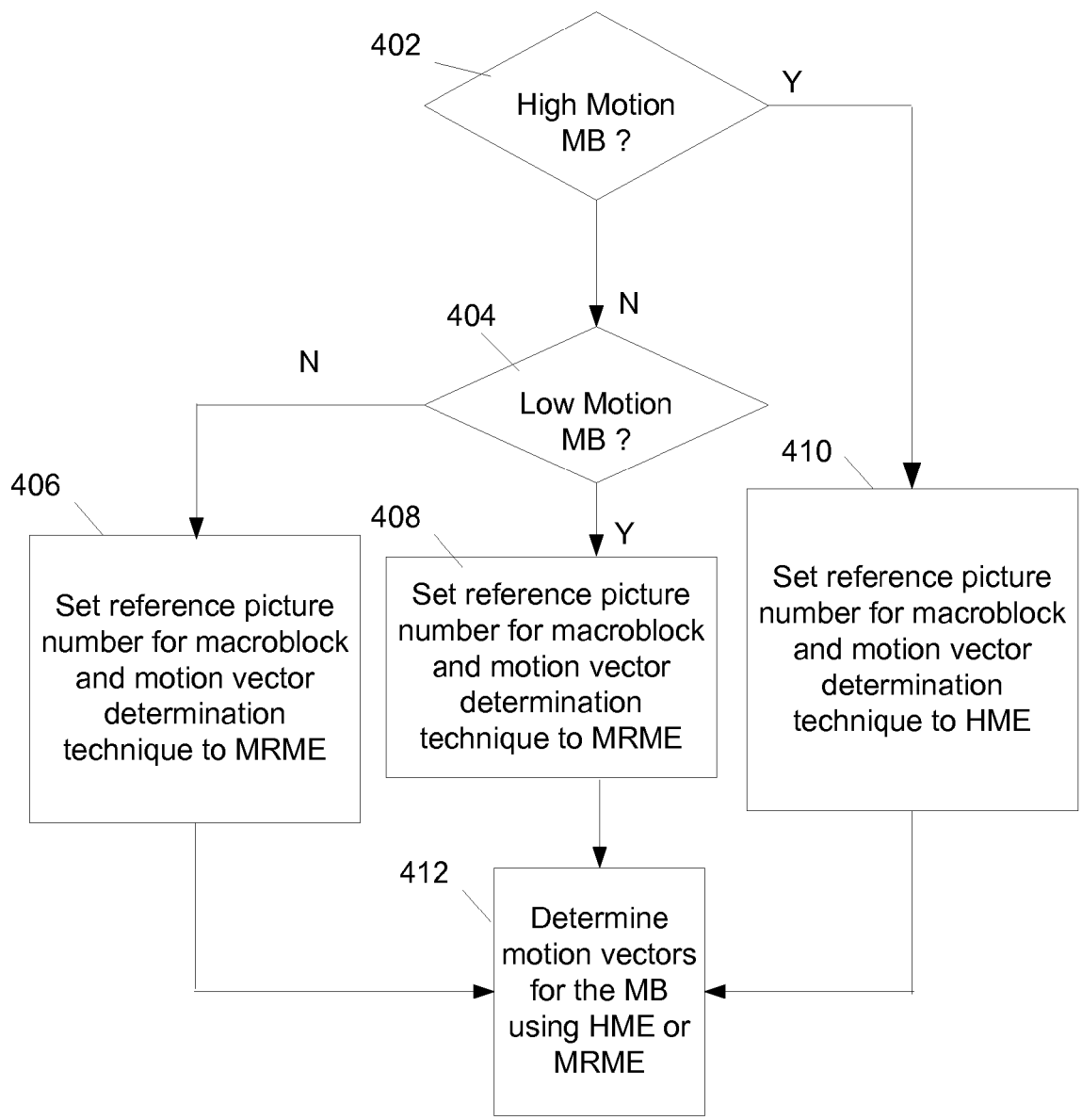
FIG. 4 depicts a flow diagram of a manner to determine whether to use HME or MRME to determine motion vectors for blocks.

FIG. 4 depicts a flow diagram of a manner to determine whether to use HME or MRME to determine motion vectors for blocks based on macro blocks.

Block 402 includes determining whether a macro block is a high motion macro block. A macro block may be a high motion macro block if abs(mv_x)>TH_2 and abs(mv_y)>TH_2, where mv_x and mv_y represent motion vectors determined in a manner similar to that of block 302. Here, TH_2 is no bigger than TH_1.

Block 404 includes determining whether a macro block is a low motion macro block. A macro block may be a low motion macro block if abs(mv_x)<=TH_2 and abs(mv_y)<=TH_2, where mv_x and mv_y represent motion vectors determined in block 304.

Block 406 includes setting a number of reference frames to one and indicating that the motion vector of the current macro block are to be determined using MRME. Variable mb_num_ref can be used to represent a number of reference frames used to determine motion vectors of the current block. Variable mb_HME_flag represents whether HME or MRME is used to determine motion vectors for the current block.

Block 408 includes setting a number of reference frames to the number of reference frames used for the slice of the current macro block and indicating that the motion vector of the current macro block is to be determined using MRME. For example, the number of reference frames used for the slice of the current macro block can be determined based on the flow diagram of FIG. 3. The number of reference frames could increase as long as power/complexity is not a concern.

Block 410 includes setting a number of reference frames to one and indicating that the motion vector of the current macro block is to be determined using HME. Accordingly, motion vectors mv_x and mv_y determined in a manner similar to that of block 302 can be used as the motion vectors for the current macro block.

Block 412 includes determining motion vectors for the current macro block and subblocks using either HME or MRME. Determination of motion vectors for the current macro block and subblocks can be made in a manner described with regard to FIG. 5.

In some embodiments, determinations of the motion vector are made based on both slice level and macro block level. Accordingly, block 312 is not performed and the process of FIG. 3 precedes the process of FIG. 4 and instead motion vectors are determined in block 412.

FIG. 5 depicts a manner of determining motion vectors for macro blocks.

Block 502 includes, in the nearest single reference frame, performing general ME within a W×H search window centered by the predicted motion vector (pmv) for a macro block and its subblocks. Determination of vector pmv is based on the well known techniques described in ITU-T Series H: AUDIOVISUAL AND MULTIMEDIA SYSTEMS: Infrastructure of audiovisual services—Coding of moving video, Advanced video coding for generic audiovisual services (March 2009), section 8.4 called "Inter prediction process" which uses median motion vectors of three macro blocks neighboring the macro block of interest.

Block 504 includes determining whether the macro block is a high motion macro block. Determination of whether the macro block is high motion can be made in a manner similar to that in block 402. If the macro block is a high motion macro block, then block 506 follows block 504. If the macro block is not a high motion macro block, then block 508 follows block 504.

Block 506 includes, in the nearest reference frame, applying ME within a W×H search window centered by the upscaled coarse level motion vector (cmv) for a macro block and its subblocks. Vector cmv is derived from a coarse level motion vector. Block 506 may determine a MV based on the ME centered from the upscaled cmv.

Block 508 includes determining whether the macro block is a low motion macro block. Determination of whether the macro block is low motion can be made in a manner similar to that in block 404. If the macro block is a low motion macro block, then block 510 follows block 508. If the macro block is not a low motion macro block, then block 512 follows block 508.

Block 510 includes, in available reference frames (other than the nearest single reference frame), performing general ME within a W×H search window centered by the predicted motion vector (pmv) for a macro block and its subblocks. The vector pmv is determined using the well known H.264, section 8.4 called "Inter prediction process." Note that vector pmv may be different for each of the reference frames.

Block 512 includes selecting motion vectors determined for the macro block based on the lowest rate-distortion cost. Blocks 502 and 510 provide multiple predicted motion vectors and blocks 502 and 506 provide predicted motion vectors and a single coarse motion vector. The motion vector and reference index with the minimum rate-distortion (RD) cost can be used to encode the current block.

Adaptive control can be used to select which of the blocks is to be performed to reduce the ME complexity while maintaining the coding gain. For example, if the current MB is a high motion MB, block 506 will also be performed for this MB and its subblocks and block 510 will be skipped for this MB and its subblocks. In addition, if only a single reference frame is to be used, block 510 will also be skipped for this MB and its subblocks. If the MB is a low motion MB, block 510 will be performed for this MB and its subblocks and block 506 will be skipped for this MB and its subblocks. If the MB is neither a high motion MB nor a low motion MB, both blocks 506 and 510 will be skipped for this MB and its subblocks. With this MB level control, the ME complexity can be greatly reduced and the high coding gain can still be achieved.

Figure 6:
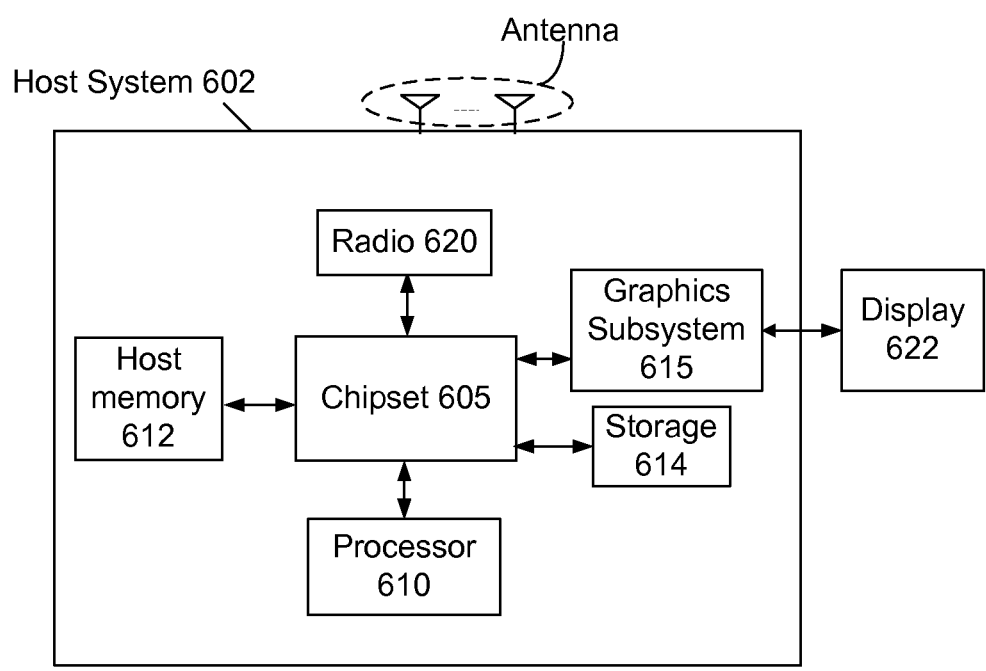
FIG. 6 depicts a system in accordance with an embodiment.

FIG. 6 depicts a system in accordance with an embodiment. System 600 may include host system 602 and display 622. Computer system 600 can be implemented in a handheld personal computer, mobile telephone, set top box, or any computing device. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fibre Channel (FC), and/or Serial Advanced Technology Attachment (S-ATA).

In various embodiments, graphics subsystem 615 may perform encoding of video with motion vector and reference frame information for motion estimation based on techniques described herein. Encoded video can be transmitted from system 600 to a video decoder.

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:
1. A computer-implemented method comprising:
   determining scaled-down coarse level motion vectors mvx and mvy using a first search window based on a scaled-down version of a reference frame and a current frame;
   using upscaled versions of mvx and mvy, said upscaled versions being mvx*S and mvy*S, to perform a motion search within a second search window wherein said second window is larger than said first search window, the motion vectors mvx and mvy scale by a scaling factor S; and transmitting encoded video including the determined motion vectors to a video decoder.

2. The method of claim 1, wherein:

when a slice of the block is a low motion slice, a number of reference frames used in determining a motion vector for the block is set to a number of reference frames in the motion buffer and transmitting encoded video includes specifying indexes of the reference frames and when a slice of the block is a high motion slice, a number of reference frames used in determining a motion vector for the block is set to one and transmitting encoded video includes not specifying an index of the reference frame.

3. The method of claim 1, wherein when the block is a high motion block, determining a motion vector for the block based on the determined motion estimation technique comprises:

determining a predicted motion vector based on a nearest reference frame;

determining a motion vector based on the nearest reference frame; and selecting a motion vector and reference frame based on a lowest rate-distortion from among the predicted motion vector based on a nearest reference frame and the motion vector based on the nearest reference frame.

4. The method of claim 3, wherein the determining a predicted motion vector based on a nearest reference frame comprises determining median motion vectors of macro blocks neighboring the block of interest.

5. The method of claim 3, wherein the determining a motion vector based on the nearest reference frame comprises applying motion estimation within a search window centered in an up-scaled version of the scaled-down motion vector.

6. The method of claim 1, wherein when the block is a low motion block, determining a motion vector for the block based on the determined motion estimation technique comprises:

determining a predicted motion vector based on a nearest reference frame;

determining at least one motion vector based on at least one available reference frame other than the nearest reference frame; and selecting a motion vector and reference frame based on a lowest rate-distortion from among the predicted motion vector based on a nearest reference frame and the at least one motion vector based on at least one available reference frame other than the nearest reference frame.

7. The method of claim 6, wherein the determining a predicted motion vector based on a nearest reference frame comprises determining median motion vectors of macro blocks neighboring the block of interest.

8. The method of claim 6, wherein the determining at least one motion vector based on at least one available reference frame other than the nearest reference frame comprises determining median motion vectors of macro blocks neighboring the block of interest.

9. An apparatus comprising:

a coarse level motion estimator to determine scaled-down coarse level motion vectors mvx and mvy using a first search window based on a scaled-down versions of a reference frame and a current frame, to use upscaled versions of mvx and mvy, said upscaled versions being mvx*S and mvy*S, to perform a motion search within a second search window wherein said second window is larger than said first search window, the motion vectors mvx and mvy scale by a scaling factor S;

an adaptive motion estimation control block to a motion estimation block to selectively determine motion vectors for the block in response to a request from the adaptive motion estimation control block.

10. The apparatus of claim 9, wherein when the block is a high motion block, the motion estimation block is to:

determine a predicted motion vector based on a nearest reference frame;

determine a motion vector based on the nearest reference frame; and select a motion vector and reference frame based on a lowest rate-distortion from among the predicted motion vector based on a nearest reference frame and the motion vector based on the nearest reference frame.

11. The apparatus of claim 10, wherein to determine a predicted motion vector based on a nearest reference frame, the motion estimation block is to determine median motion vectors of macro blocks neighboring the block of interest.

12. The apparatus of claim 10, wherein to determine a motion vector based on the nearest reference frame, the motion estimation block is to apply motion estimation within a search window centered in an up-scaled version of a scaled-down motion vector.

13. The apparatus of claim 9, wherein when the block is a low motion block, the motion estimation block is to:

determine a predicted motion vector based on a nearest reference frame;

determine at least one motion vector based on at least one available reference frame other than the nearest reference frame; and select a motion vector and reference frame based on a lowest rate-distortion from among the predicted motion vector based on a nearest reference frame and the at least one motion vector based on at least one available reference frame other than the nearest reference frame.

14. The apparatus of claim 13, wherein to determine a predicted motion vector based on a nearest reference frame, the motion estimation block is to: determine median motion vectors of macro blocks neighboring the block of interest.

15. The apparatus of claim 13, wherein to determine at least one motion vector based on at least one available reference frame other than the nearest reference frame, the motion estimation block is to: determine median motion vectors of macro blocks neighboring the block of interest.

16. The apparatus of claim 13, wherein:

when a slice of the block is a low motion slice, a number of reference frames used to selectively determine motion vectors for the block is set to a number of reference frames in the motion buffer and when a slice of the block is a high motion slice, a number of reference frames used to selectively determine motion vectors for the block is set to one.

17. The apparatus of claim 13, wherein a high motion slice comprises a slice with more than a predetermined number of high motion blocks.

18. A system comprising:

a display device;

a wireless network interface; and a computer system configured to:

determine scaled-down coarse level motion vectors mvx and mvy using a first search window based on a scaled-down version of a reference frame and a current frame, use upscaled versions of mvx and mvy, said upscaled versions being mvx*S and mvy*S, to perform a motion search within a second search window wherein said second window is larger than said first search window, the motion vectors mvx and mvy scale by a scaling factor S, determine a motion vectors for the block based on the determined motion estimation technique.

19. The system of claim 18, wherein: when a slice of the block is a low motion slice, a number of reference frames used to determine a motion vector for the block is set to a number of reference frames in the motion buffer and when a slice of the block is a high motion slice, a number of reference frames used to determine a motion vector for the block is set to one.

20. The system of claim 18, wherein:

when the block is a high motion block, to determine a motion vector for the block based on the determined motion estimation technique, the computer system is to:

determine a predicted motion vector based on a nearest reference frame;

determine a motion vector based on the nearest reference frame; and select a motion vector and reference frame based on a lowest rate-distortion from among the predicted motion vector based on a nearest reference frame and the motion vector based on the nearest reference frame;

when the block is a low motion block, to determine a motion vector for the block based on the determined motion estimation technique, the computer system is to:

determine a predicted motion vector based on a nearest reference frame, determine at least one motion vector based on at least one available reference frame other than the nearest reference frame, and select a motion vector and reference frame based on a lowest rate-distortion from among the predicted motion vector based on a nearest reference frame and the at least one motion vector based on at least one available reference frame other than the nearest reference frame.

* * * * *